US008228292B1

(12) United States Patent
Ruiz et al.

(10) Patent No.: US 8,228,292 B1
(45) Date of Patent: Jul. 24, 2012

(54) FLIPPING FOR MOTION-BASED INPUT

(75) Inventors: Jaime Guillermo Ruiz, Kitchener (CA); Yang Li, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,575

(22) Filed: Sep. 30, 2011

Related U.S. Application Data

(63) Continuation of application No. 12/770,325, filed on Apr. 29, 2010.

(60) Provisional application No. 61/320,663, filed on Apr. 2, 2010.

(51) Int. Cl.
*G09G 5/00* (2006.01)
(52) U.S. Cl. .......................... 345/156; 345/172
(58) Field of Classification Search ........... 345/157–163
See application file for complete search history.

(56) References Cited

U.S. PATENT DOCUMENTS

| 7,881,902 B1* | 2/2011 | Kahn et al. ................. 702/160 |
| 2008/0192005 A1 | 8/2008 | Elgoyhen et al. |
| 2009/0262074 A1 | 10/2009 | Nasiri et al. |
| 2009/0303184 A1* | 12/2009 | Tao et al. .................... 345/163 |

OTHER PUBLICATIONS

Bartlett. "Rock 'n' Scroll Is Here to Stay." IEEE Comput. Graph. Appl., vol. 20, Issue 3, 2000.*
'Android' [online] "Android Open Source Project," 2010, [retrieved on Feb. 9, 2012]. Retrieved from the Internet: URL: < http://source.android.com>. 2 pages.
Bartlett. "Rock 'n' Scroll Is Here to Stay." IEEE Comput. Graph. Appl., vol. 20, Issue 3, 2000, pp. 40-45.
Buxton. "Lexical and pragmatic considerations of input structures." SIGGRAPH Comput. Graph, vol. 17, Issue 1, 1983, pp. 31-37.
Gonsalves. 'Information Week' [online] "Apple iPhone Market Share Slips in 4Q," 2010, [retrieved on Feb. 9, 2012]. Retrieved from the Internet: URL: < http://www.informationweek.com/news/telecom/business/showArticle.jhtml?articleID=222600940>. 2 pages.
'Google' [online] "Google Maps with Street View," 2011, [retrieved on Feb. 9, 2012]. Retrieved from the Internet: URL: < http://maps.google.com/help/maps/streetview/>. 1 page.
'Google' [online] "Nexus One," 2012, [retrieved on Feb. 10, 2012]. Retrieved from the Internet: URL: < http://www.google.com/phone/detail/nexus-one>. 2 pages.
Harrison et al. "Squeeze me, hold me, tilt me! An exploration of manipulative user interfaces." Conference paper in *CHI '98: Proceedings of the SIGCHI conference on Human factors in computing*. New York, ACM/Addison-Wesley, 1998, pp. 17-24. Abstract Only, [retrieved on Feb. 10, 2012]. Retrieved from the Internet: URL: < http://www.mendeley.com/research/squeeze-me-hold-me-tilt-me-an-exploration-of-manipulative-user-interfaces/#page-1>. 1 page.

(Continued)

*Primary Examiner* — Ke Xiao
(74) *Attorney, Agent, or Firm* — Fish & Richardson P.C.

(57) ABSTRACT

A computer-implemented method for identifying motion-based inputs to an electronic device involves determining that the electronic device has been rotated in a first direction of rotation past a first threshold orientation; determining that the electronic device has been rotated in a second direction of rotation that is substantially the opposite of the first direction of rotation, past a second threshold; and analyzing motion of the device to identify motion-based inputs to the device other than the rotation of the device in the first and second directions, based on the two determinations.

21 Claims, 7 Drawing Sheets

OTHER PUBLICATIONS

Hinckley et al. "Design and analysis of delimiters for selection-action pen gesture phrases in scriboli." Conference paper in *CHI '05: Proceedings of the SIGCHI conference on human factors in computing systems*. New York, ACM, 2005, pp. 451-460.

Hinckley et al. "Sensing techniques for mobile interaction." Conference paper in *UIST '00: Proceedings of the 13th annual ACM symposium on User interface software and technology*. New York, ACM, 2000, pp. 91-100.

Jones et al. "GesText: Accelerometer-based Gestural Text-Entry Systems." Conference paper in *CHI '10: Proceedings of the SIGCHI conference on Human factors in computing systems*. 2010, 10 pages.

Li et al. "Experimental analysis of mode switching techniques in pen-based user interfaces." Conference paper in CHI '05: Proceedings of the SIGCHI conference on Human factors in computing systems. New York, ACM, 2005, pp. 461-470.

Liu et al. "User evaluation of lightweight user authentication with a single tri-axis accelerometer." Conference paper in *MobileHCI '09: Proceedings of the 11th International Conference on Human-Computer Interaction with Mobile Devices and Services*. New York, ACM, 2009, pp. 1-10.

Myers and Rabiner. "A Comparative Study of Several Dynamic Time-warping Algorithms for Connected Word Recognition." *The Bell System Technical Journal*, vol. 60, Issue 7, 1981, pp. 1389-1409.

'Nintendo' [online]. "Wii at Nintendo," 2012, [retrieved on Feb. 9, 2012]. Retrieved from the Internet: URL: < http://www.nintendo.com/wii>. 3 pages.

Partridge et al. "TiltType: accelerometer-supported text entry for very small devices." Conference paper in *UIST '02: Proceedings of the 15th annual ACM symposium on User interface software and technology*. New York, ACM, 2002, pp. 201-204.

Rekimoto. "Tilting operations for small screen interfaces." Conference paper in *UIST '96: Proceedings of the 9th annual ACM symposium on User interface software and technology*. New York, ACM, 1996, pp. 167-168.

Ruiz et al. "A model of non-preferred hand mode switching." Conference paper in GI *'08: Proceedings of graphics interface 2008*. Toronto, Canadian Information Processing Society, 2008, pp. 49-56.

Ruiz and Lank. "A study on the scalability of non-preferred hand mode manipulation." Conference paper in ICMI '07: *Proceedings of the 9th international conference on multimodal interfaces*. New York, ACM, 2007, pp. 170-177.

Small and Ishii. "Design of spatially aware graspable displays." Conference paper in *Chi '97: Chi '97 extended abstracts on human factors in computing systems*. New York, ACM, 1997, pp. 367-368.

Weberg et al. "A piece of butter on the PDA display." Conference Paper in *CHI '01: CHI '01 extended abstracts on human factors in computing systems*. New York, ACM, 2001, pp. 435-436.

Wigdor and Balakrishnan. "TiltText: using tilt for text input to mobile phones." Conference paper in *UIST '03: Proceedings of the 16th annual ACM symposium on User interface software and technology*. New York, ACM, 2003, pp. 81-90.

'Wikipedia' [online]. "Dynamic time warping—Wikipedia, the free encyclopedia," 2011, [retrieved on Feb. 9, 2012]. Retrieved from the Internet: URL: < http://en.wikipedia.org/wiki/Dynamic_time_warping>. 3 pages.

'Wikipedia' [online]. "iPhone—Wikipedia, the free encyclopedia," 2012, [retrieved on Feb. 9, 2012]. Retrieved from the Internet: < http://en.wikipedia.org/wiki/IPhone>. 16 pages.

Wobbrock et al. "Gestures without libraries, toolkits or training: a $1 recognizer for user interface prototypes." Conference paper in *UIST '07: Proceedings of the 20th annual ACM symposium on User interface software and technology*. New York, ACM, 2007, pp. 159-168.

* cited by examiner

FLIPPING FOR MOTION-BASED INPUT

CROSS-REFERENCE TO RELATED APPLICATIONS

This application is a continuation of and claims priority to U.S. application Ser. No. 12/770,325, filed on Apr. 29, 2010, which claims priority to U.S. Provisional Application Ser. No. 61/320,663, entitled "Flipping for Motion-Based Input," filed on Apr. 2, 2010, the entire disclosure of which is incorporated herein by reference.

TECHNICAL FIELD

This document relates to systems and techniques for interpreting motion-based user inputs to a mobile computing device.

BACKGROUND

The use of motion-based inputs in computing devices has become more and more pervasive over the last several years. Motion-based inputs are inputs that involve movement of an entire device housing, such as by a user's hands, as distinguished from typed, spoken, or touch screen inputs. Primary interaction with the NINTENDO WII gaming console is motion-based (moving the entire WIIMOTE device), and many smartphones have accelerometers and other motion-sensing components such as magnetometers. Generally, sensor-based interactions in mobile phones have occurred with respect to specific application contexts, such as tilt detection in games and determining screen orientation.

Some mobile devices depend on users to press a button and/or hold down a button while making a motion input, in order to indicate an intent that their movement of a device be interpreted as a purposeful input rather than as meaningless general motion of the device. Such a mechanism gives the user control over how the device interprets the user's inputs, but it may be difficult for a user to maintain force on a button while performing various motion-based input actions.

SUMMARY

This document describes systems and techniques that may be used to permit interpretation and analysis of motion-based inputs to a computing device. For example, a motion of turning a device over and then turning in back to approximately its original orientation can be identified as a user input to switch into a motion-based input mode on the device. As such, after a flip/un-flip (or double flip) input motion has been provided to a device, subsequent motion of the device may be sensed and interpreted according to a set of predetermined motion-based inputs. For example, while the mode is changed, tilting of the device may be interpreted to move a cursor on a display of the device in the direction of the tilting.

To change the device back to its original mode in which motion-based input is not active, a user may repeat the double flip or perform another action (including by inaction, such as by not moving the device for a predetermined time period). Also, rather than preceding one or more motion-based commands with a double flip, a motion-based command may be provided by a user, and may be followed by a delimiter input such as a double-flip, where the command is recognized and executed only after the delimiter input is received.

The mode switching and motion-based inputs may be handled by a universal component, such as a component of an operating system on a device, to which various applications on the device may subscribed and may then receive information. For example, an input method editor (IME) on a device may provide functionality for intercepting all inputs to a device (e.g., via physical keyboard, virtual keyboard, softkeys, trackballs, device motion, and voice) and for converting those inputs into a common form that can be passed to applications that are running on the device. As one example, an application may be open to receiving directional inputs from a user of the device on which the application is executing. The application may be unconcerned with whether the user enters the information via swiping on a touch screen, rolling a trackball, pressing on a D pad, or using motion-based input. Rather, an IME may receive the inputs, may manage whether the device is in a motion-based input mode, and may supply the application with information regarding the user's directional input, where the supplied information is essentially independent of the mechanism by which the user provided the input.

In certain implementations, such systems and technique may provide one or more advantages. For example, motion-based input may be more intuitive than is keyboard or touch screen input in many instances. However, a user may not want to have their device be open to receiving motion-based input at all times (lest they accidentally provide input that they did not intend). Therefore, the techniques here can provide an input that is natural, but is not likely to be occur by accident (i.e., by mere jostling of the device), so that a user can easily switch to an input mechanism that may be more convenient for them at the moment. In addition, in certain implementations, the gesture to turn on motion-based input gives users the control to activate motion gestures without any hardware modifications to existing devices. The gesture can be quick to perform and can be performed in a limited amount of physical space. In addition, a motion to activate a motion-based input mode, and subsequent motions to provide such additional input, may be made without a user having to pause at all.

In one implementation, a computer-implemented method for identifying motion-based inputs to an electronic device is disclosed. The method comprises determining that the electronic device has been rotated in a first direction of rotation past a first threshold orientation; determining that the electronic device has been rotated in a second direction of rotation that is substantially the opposite of the first direction of rotation, past a second threshold; and analyzing motion of the device to identify motion-based inputs to the device other than the rotation of the device in the first and second directions, based on the two determinations. Determining that the electronic device has been rotated past the first and second thresholds can comprise comparing motion data for the device to an electronic model that represents motion by one or more other users performing a mode-switching motion. Also, comparing the motion data for the device to the electronic model can comprise performing a dynamic time warping comparison. In addition, analyzing motion of the device based on the two determinations can be triggered by determining that a distance between motion data for the electronic device and motion data in the model falls below a threshold distance. The method can also comprise receiving motion data from electronic motion sensors in the electronic device and quantizing the received data before comparing the received data to the model. Moreover, the method can further comprise compressing the received motion data using a moving averaging window on the data over time.

In some aspects, the electronic model is formed by wirelessly gathering data from users of mobile computing devices during normal operation of the mobile computing devices. In addition, analyzing motion of the device can be based on the two determinations comprises changing from a mode in which particular motion-based inputs are not recognized by the device to a mode in which the particular motion-based inputs are recognized by the device. The method can further comprise receiving motion-based gestures from a user of the electronic device and converting the received gestures to commands for one or more applications on the electronic device. An input method editor (IME) on the electronic device can also convert the received gestures to commands, selects an active application on the device from among multiple applications, and provides data for the commands to the selected active application.

In other aspects, the electronic device is in a position so that a graphical display of the electronic device faces a user of the electronic device both before the device is rotated in the first direction and after the device is rotated in the second direction. In addition, analyzing motion of the device based on the two determinations can comprise analyzing data for motion-based input received in a window of time that precedes the rotations in the first direction and the second direction. Also, analyzing motion of the device based on the two determinations can comprise interpreting received motion data without switching to a motion-based input mode.

In another implementation, a computer-implemented method for identifying motion-based inputs to an electronic device is disclosed. The method comprises obtaining data that characterizes a user's motion of the electronic device in free space; determining whether the obtained data matches a model for a particular gesture that corresponds to mode switching; and switching the electronic device, based on the determination, into a mode in which motion of the device in free space is interpreted as intentional user motion-based input and is used to control one or more applications executing on the electronic device. Determining whether the obtained data matches the model for the particular gestures can comprise performing a dynamic time warping comparison between the model and the obtained data. Switching the electronic device can be triggered by determining that a distance between motion data for the electronic device and motion data in the model falls below a threshold distance. In addition, obtaining data that characterizes the user's motion of the electronic device in free space can comprise receiving motion data from electronic motion sensors in the electronic device and quantizing the received data before determining whether the obtained data matches the model.

In certain aspects, the method further comprises compressing the received motion data using a moving averaging window on the data over time. The electronic model can also be formed by wirelessly gathering data from users of mobile computing devices during normal operation of the mobile computing devices. In addition, switching the electronic device can comprise changing from a mode in which particular motion-based inputs are not recognized by the electronic device to a mode in which the particular motion-based inputs are recognized by the electronic device.

In yet another implementation, a computer-implemented system for identifying motion-based input to an electronic device comprises one or more motion sensors mounted inside a housing of the electronic device, and a mode switching module. The module is programmed to use information from the motions sensors to determine whether the electronic device has been: (a) rotated in a first direction of rotation past a first threshold orientation, and (b) rotated in a second direction of rotation that is substantially the opposite of the first direction of rotation, past a second threshold. The modules is also programmed to cause an operational mode of the electronic device to be switched based on the two determinations.

The details of one or more embodiments are set forth in the accompa-nying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for handling motion-based input to a computing device such as a smart phone or app phone. As described here, a particular motion-based input may be assigned as a delimiter to indicate that a user would like to "open" the device to additional motion-based inputs—i.e., to switch input modes on the device so that the other motion-based inputs, which were previously disabled, will be enabled. The delimiting input discussed here is a double flip, whereby a user makes a first motion with the device, and then backtracks through the motion, where the particular motion here involves rotating the device approximately 180 degrees about an axis of the device and then rotating it back substantially to its original orientation. The delimiting motion could be other motions, though will generally be selected from motions that are not commonly made accidentally by the user of a mobile device, so that the user's device will change modes only when the user intends that it changes modes.

Figure 1A:
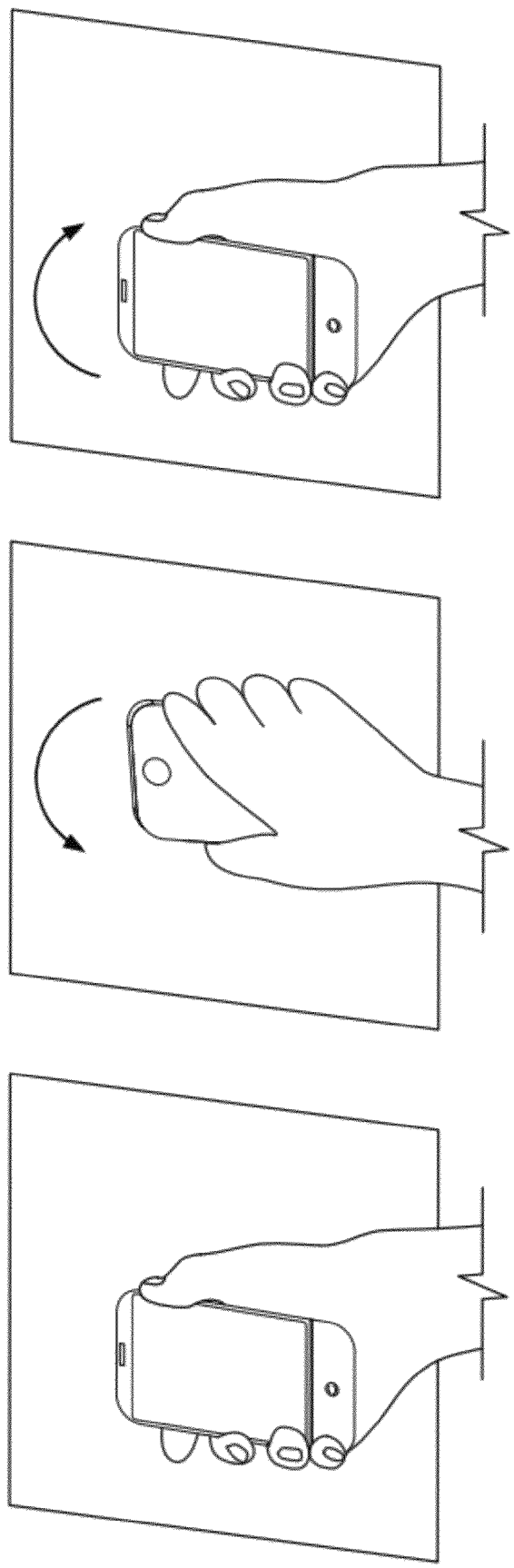
FIGS. 1A and 1B show motion-based inputs to a wireless computing device.
Figure 1B:
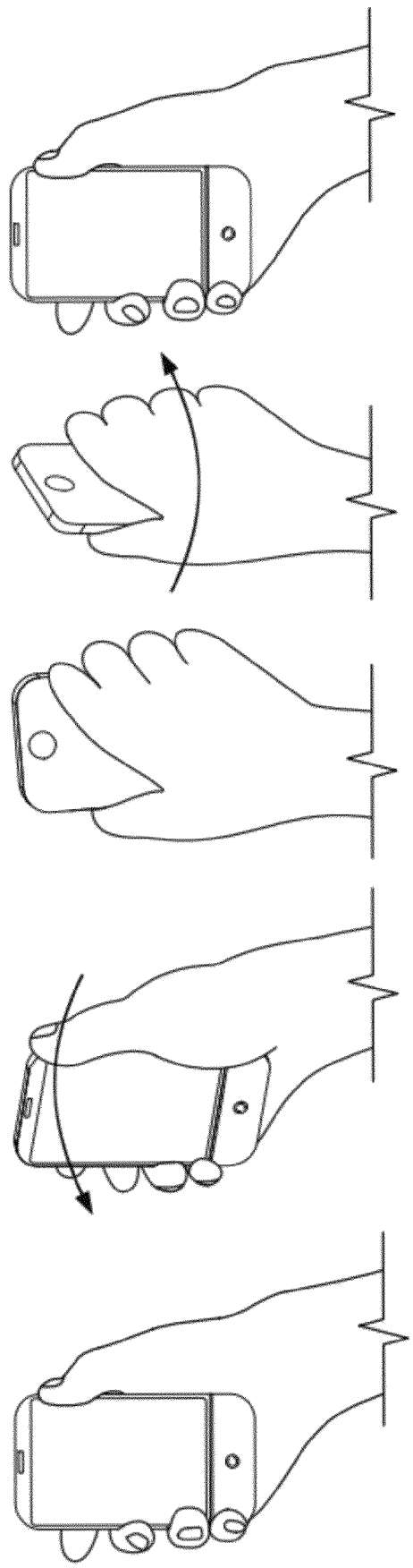

FIGS. 1A and 1B show motion-based inputs to a wireless computing device. Referring to FIG. 1A, there are shown three chronological instances of a user's interaction with a touch screen smart phone that the user is holding in her right hand. In each instance, the user is holding the device horizontally above a horizontal surface like the top of a table. In instance (a), the user is cradling the device in her palm, with a touch screen of the device facing upward. The user may have just picked the device up off the table, or may have just finished interacting with the device, such as by contacting a surface of a touch screen on the device with her left forefinger.

In instance (b), the user has rotated her hand while gripping the device in a normal manner, approximately 180 degrees counterclockwise (as viewed from the user's arm). As a result, the face of the smart phone is now pointing substantially downward toward the table or floor. The rotation in this example has been substantially about a longitudinal axis that passes from the top of the smart phone to the bottom (though the axis may translate some during the rotating motion). In short, the user has flipped the device over.

The user may hold the device in this orientation for a time period, which may be as little as a split instant. Then the user may turn their wrist back clockwise, placing the device in the orientation shown in instance (c), where the touch screen on the device is again facing upward, presumably so that the user can easily view the screen. The device may have been returned substantially to its original orientation, though it may have translated some during the flip and unflip motion (e.g., if the user is walking or driving while performing the motions).

The effect of this motion-based input may be to change an operating mode of the device. For example, the change may involve changing from one operating application on the device to a second operating application (where the device supports multi-tasking). The direction that the user tilted the device may affect the direction that the application on the display is shifted. For example, each application may be represented by a card on a graphical user interface, and the various cards may be displayed in a horizontal row (e.g., with inactive applications on the left and right edge of a graphical display). Flipping to the left and back may cause the device to push the row of applications to the left in response to such a motion, and thus to make the application that was previously to the right of the prior active application, the new active application.

The motion-based input may also be used to affect the display of a particular application on the device. For example, the input may be used to change pages in a document being displayed on the device. For example, flipping a device over to the left and back may turn a page forward in a book or word-processing document that is being displayed on the device. Such motion-based inputs may also be used to shift through photographs, record albums, songs, or other items on the device. Again, the direction (right or left, or up or down) that the user tilts the device may affect the direction that such a shift is made.

The threshold level of motion that is required in order to affect a change in the operation of the device like those discussed here may be determined in a number of manners. For example, a certain level of inclination of the device against a base plane (which may be a horizontal plane or a slanted plane) may trigger the change. Alternatively, a certain amount of change in inclination or certain degrees or radians of rotation may be the trigger, even if a certain level of inclination is not reached. Also a combination of absolute change and relative change may be required for a trigger to occur.

In addition, the degree of motion to trigger a mode change or similar input may be a function of motion-based inputs measure from a plurality of mobile device users. For example, as explained below, certain users may be asked to perform various motion-based gestures, the orientation or other motion-related information from their actions may be recorded, and a model may be constructed of their motion. That model may then be loaded on a later user's device and matched to motions by that later user in order to determine whether the later user intend a particular motion. Thus, if the model indicates that most users flip their devices only 150 degrees when trying to change modes, then a subsequent mode change for another user may be triggered based on a 150 degree rotation of her device.

Such training can be used for multiple motions, including for a delimiter like that just discussed, and subsequent motion inputs that may be received after the delimiter causes the device to be changed to a motion-based input mode. For example, users whose inputs are used as training data may be asked to execute a number of motions and the motion-based data measured from their devices (e.g., from accelerometers in the devices) may be correlated with the relevant action that were asked to perform. Such actions may include shaking of a device, tapping on a device, jerking a device in a particular manner (e.g., as if the user is setting the hook in a fish, when the device represents the user's fishing reel and pole), waggling the device loosely, and the like.

In addition to a threshold for the level of the initial motion (e.g., the flip) needed to trigger recognition of a user input by a device, a system may include a threshold for a level of backtracking motion (e.g., the unflip) before a delimiter will be triggered. For example, a threshold number of degree of rotation in the backtracking direction may be used (either absolute degrees or degrees relative to the original flipping motion, such as +/−15 degrees from the initial rotation motion), or a certain orientation relative to the starting orientation may be used as a trigger threshold. And again, comparison to models of training user behavior (and subsequent gathered motion/orientation data) may be made such as in the manners discussed in detail below.

Referring now to FIG. 1B, a similar chronological sequence is shown, though here in five separate images. In this example, there is no background surface (e.g., no table under the user's hand), so that no absolute frame of reference for the motion is shown here. That is because the comparisons described here may be made if the longitudinal axis of the device is horizontal, vertical, or at an angle in between horizontal and vertical. Also, although there are references here to axes, rotations about the axes, and rotating a device 180 degrees, it should be understood that substantial compliance is acceptable, within an understanding of acceptable repeatability by a user of a device so that a proper level of false positives or false negatives is maintained. In particular, absolute values may be assigned as predetermined values to make a device determine when an intended delimiter-creating input is provided (e.g., flipping a device more than 160 degrees total or within 15 degrees from flat horizontal), or acceptable exceptions from model data may be used (e.g., so that 95% of motion inputs that a training group intended to be inputs are considered to be inputs in the model).

In the figure, the user is first holding their device (e.g., a Nexus One telephone) in a right hand so that its screen is facing them. They then start rotating their hand counterclockwise (as viewed down the user's wrist toward her hand) until the telephone has been rotated through an angle of about 170 degree and then rotated back to substantially its original orientation. Note that, with the input completed, the screen is again facing the user, so that the user is in a good position to continue using the phone in a manner that is particularly useful.

Figure 2:
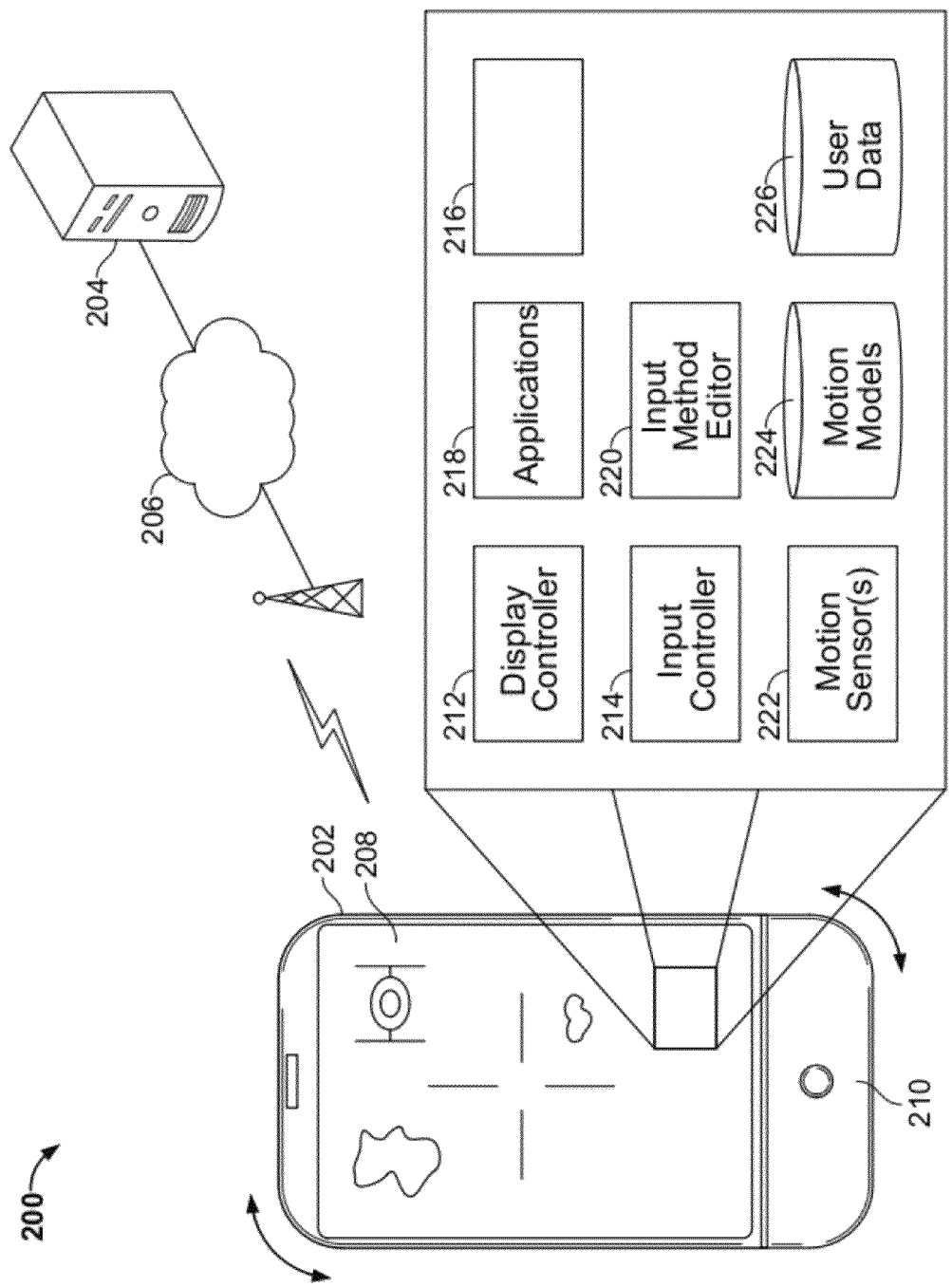
FIG. 2 is a schematic diagram of a smart phone system that supports motion-based inputs.

FIG. 2 is a schematic diagram of a smart phone system 200 that supports motion-based inputs. In general, the system is represented by a mobile device 202, such as a smart phone, that has a touch screen display 208. In addition, the device 202 may have alternative input mechanisms, such as a track ball 210, D Pad, and other selectable buttons. A number of components within the device 202 may provide for interaction by the device 202 in various manner, including by motion-based inputs (i.e., where the device itself is moved to provide inputs). Only certain example components are shown here, for purposes of clarity. In this example, the display 208 is showing a first-person shooting spaceship game, where, when the device is in a motion-based input mode, the user can steer their spaceship by rotating the device right or left (to bank their view to the right or left, respectively), and tilting it forward and backward in a familiar manner.

The device 202 may communicate via a wireless interface 216, through a network 206 such as the internet and/or a cellular network, with servers 204. For example, the device 202 may carry telephone calls through a telephone network or through a data network using VOIP technologies in familiar manners. Also, the device 202 may transmit other forms of data over the internet, such as in the form of HTTP requests that are directed at particular web sites, and may receive responses, such as in the form of mark-up code (e.g., HTML) for generating web pages, as media files, as electronic messages, or in other forms.

A number of components running on one or more processors installed in the device 202 may enable a user to have simplified motion-based input on the device 202 and touch screen input on the display 208. For example, an interface manager 216 may manage interaction with the touchscreen interface 204, and may include a display controller 212 and a touchscreen input controller 214.

The display controller 212 may manage what information is shown to a user via interface 208. For example, an operating system on the device 202 may employ display controller 212 to arbitrate access to the interface 202 for a number of applications 218 that are running on the device 202. In one example, the device 202 may display a number of applications, each in its own window, and the display manager may control what portions of each application are shown on the interface 202.

The input controller 214 may control the handling of data that is received from a user via the touch screen display 208 or other input mechanisms. For example, the input controller 214 may coordinate with the display controller 212 to identify where, on the display 208, a user is entering information (e.g., where the cursor is or where the user's finger is contacting the display) so that that the device may understand the context of the input. In addition, the input controller 214 may determine which application or applications 218 should be provided with the input. For example, when the input is provided within a text entry box of an active application, data entered in the box may be made available to that application. Likewise, applications 218 may subscribe with the input controller 214 so that they may be passed information that is entered by a user in appropriate circumstances. In one example, the input controller 214 may be programmed with an alternative input mechanism like those shown in FIGS. 1A and 1B, and may manage which application or applications 218 are to receive information from the mechanism.

An input method editor (IME) 220 may also be provided for similar purposes—e.g., to serve as a mediator of various modes of input provided by a user to the device, to interpret such inputs in certain situations, and to pass the inputs to the relevant application or applications in a common format (e.g., via a published API). In particular, the IME 220 may be a form of operating system component that serves as an intermediary between other applications on a device and the interface controller 214. The IME 220 generally is provided to convert user inputs, in whatever form, into textual formats or other formats required by applications 218 that subscribe to receive user input for a system. For example, the IME 220 may receive voice input, may submit that input to a remote server system, may receive back corresponding textual data, and may pass the textual data to an active application. Similarly, the IME 220 may receive input in Roman characters (e.g., A, B, C . . . ) in pinyin, and may provide suggested Chinese characters to a user (when the pinyin maps to multiple such characters), and then pass the user-selected character to a subscribing application. Relevant to the input techniques discussed above, the IME 220 may also interpret motion-based inputs sensed by motion sensors 222 (which as used here can include orientation sensors that operate without depending on motion of the device 202), such as accelerometers and magnetometers. For example, an application that wishes to take advantage of a motion-based interface may register (e.g., when it is executed) with the IME 220, designating certain motions as corresponding to standard control inputs, such as a downward sweeping motion corresponding to the downward directional portion of a D-pad control. The IME 220 may then provide information to the application at appropriate times when motion-based input is employed by the user.

The IME 220 or other form of motion input processing module may make use of user data 226 and motion models 224. The user data 226 may include various information by which the operation of device 202 may be customized for a particular user. For example, a user may select particular motion-based gestures to correspond to certain commands on device 202, and such information may be used by IME 220 when determining how to interpret received motion-based input from the user. The motion models may contain data generated from testing various users in providing motion-based input, so that the models can be compared to motion-based inputs of a user of device 202 in order to interpret what the user of device 202 intends by their inputs.

Along with motion-based inputs that correspond to control functions, in certain implementations, the IME 220 or another form of gesture interface can register certain motions or activities by the user as being indicative of activating a motion-based input mode on the device 202. For example, the user may indicate a desire to use the motion-based input mechanisms described here by moving the device in a certain manner in free space, such as by rotating it in a certain manner and then rotating it back to its initial orientation. Upon receipt of such an event, for example, the input controller 214, using the IME 220, may report subsequent inputs as if they were received on a different sort of input mechanism (e.g., a trackball 210 or D Pad). For example, the input controller 214 may report a certain amount of input movement in a particular direction based on how far a user sweeps the device 202 in open space in a particular direction. The input controller 214, via the IME 220, may also report coordinated inputs that are provided by a user on the surface of the display 208.

The IME 220 or other gesture interface may also reformat data in other manners. In one example, a music player application may not have been written to work with the motion-based input mechanisms described here. Instead, the music player may receive information to scroll as an indication that a user has slid their finger on the screen. The IME 220 may be programmed to reside in a communication channel between the input controller 214 and the application, and may convert motion-based input (e.g., tipping the devoice 202 forward) into the form of messages that the music player application expects to see from the input controller 214 (e.g., sliding of a finger upward on a list of songs on the screen so as to scroll them upward). In this manner, the system 200 can provide a number of different manners in which to provide quick and convenient user input to one or more applications running on device 202, even when certain of the applications were not specifically written to receive motion-based input.

As noted above, a motion-based delimiting input may either precede or follow other motion-based inputs that the delimiter is aimed to identify for a device. Where the delimiter leads the other inputs, the device may be switched to a motion-based input mode until another mode-switching event occurs (e.g., a repetition of the delimiter action or a passage of a predetermined amount of time, e.g., 60 seconds, without motion-based input). Where the delimiter follows the other inputs, motion-based data may be cached across a trailing window of time on a device, and if a delimiter input is received within a predetermined time period of such input (e.g., 200 ms), the data in the cache may be processed to determine what additional motion-based input the user of the device would like to perform.

Also, the processing of a delimiter input as being a following or leading input may be context-sensitive. For example, as noted a cache of motion-based data may be maintained, and when a delimiter input is received, the cache may be checked to determine if the data in the cache matches any motion-based input. If it does, that input may be processed and provided to an application as an input. The device may then switch modes or may simply stay in a non-motion based input mode (e.g., under the assumption that the user wants to enter only one or a few inputs when they use a trailing delimiter, and the flipping/unflipping of their device is perceived as the action of dumping the accumulated data from cache into the device system). If no recognizable motion-based input data is found in the cache, the device may be switched to a motion-based input mode, and subsequent motion-based inputs may be processed accordingly.

Figure 3:
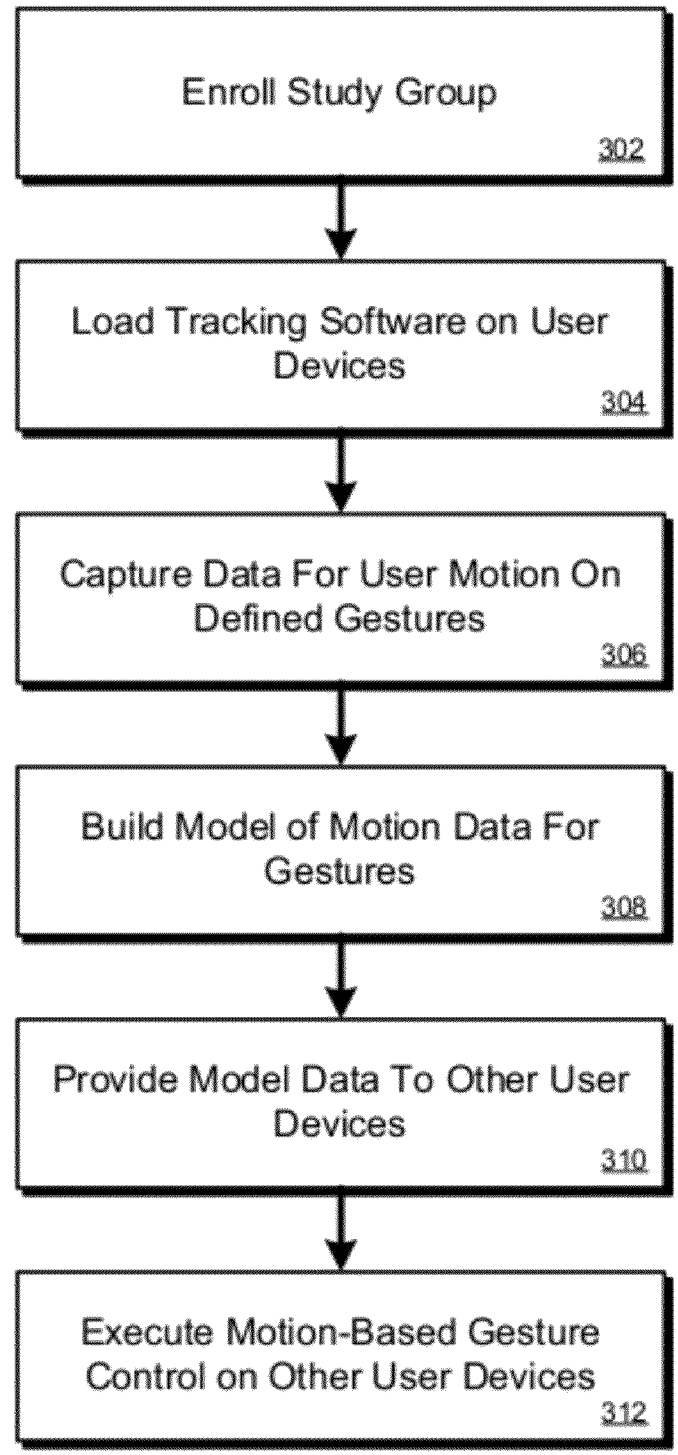
FIG. 3 is a flow chart of a process for training a motion-based input model employing a group of mobile device users.

FIG. 3 is a flow chart of a process for training a motion-based input model employing a group of mobile device users. The process generally involves providing to an adequately large number of users, software that they may execute on their mobile devices that include motion or orientation sensors, and that record particular information about the motion of those devices under use, so as to capture data that represents motion by the users in carrying out one or more particular gestures. Such information is then used to determine whether motions by other users on other devices is intended to represent the particular gestures.

Such an approach can assist in permitting devices to distinguish normal motion that a user does not intend their device to act upon, from motion-input that the user does want the device to act upon, with a high recognition rate and low false negative rate.

The process begins at box 302, where a study group is enrolled. The study group may include volunteers who have responded to a request for study participants via an on-line mechanism. For example, a bulletin board posting or electronic mail may be provided to users who are likely to have relevant computing hardware for the study, and those users may voluntarily enroll in the study. The enrollees may be from the general public, or a more controlled group such as employees of a company that provides such computing devices to its employees. Such enrollment may involve storing identification information for the members of the group, demographic information (e.g., age, gender, and technical skills), along with information about each user's mobile device (e.g., ID number and device model).

For members who fit the requirements of the study and have devices that are capable of performing in the study, tracking software is downloaded to the users' computing devices at box 304. The software is programmed to access data from the device accelerometer and orientation sensor(s), to format and store such data, and to subsequently upload it so that it can be analyzed. Thus, at box 306, data on the user motion is captured for certain defined gestures. For example, an image showing a gesture may be displayed on a user's screen, and the user may be asked to perform the motion, such as after their device beeps to indicate that their input is being tracked and recorded. Other motions may then be displayed, and the stored motion data may be associated with the particular gestures that the user was asked to perform.

Alternatively, the user may be provided with applications that respond to motion-based input, and the user may interact with the applications in such a way. The tracking software may know the gestures a user is to perform for each of various functions, and may assign motion input to a particular gesture when such input can be distinguished form other possible inputs that the user may be trying to provide to the device.

Also, initial training of the users may occur, where the users are each instructed on motion-based inputs, and the user may then continue to interact with applications on their devices using the motion-based inputs. One such motion-based input may be a motion-based input that changes a device into a mode in which it can receive additional motion-based inputs and interpret those inputs as purposeful activity by the user rather than simply collateral motion of the user's device. When such motion-based inputs are then provided by the users in the group, their particular devices may store or upload sensed motion data from their movement of the devices, where the data may be associated with the particular motion-based commands to which the users were directing their inputs. For example, if a flip-unflip motion is sensed, the motion-based data may be associated with a command that is responsive to a flip-unflip input. The user data may also be correlated to particular device models so that data may be grouped and provided to for use by other users of the same device models, since the shape or size of a particular mobile device may change the way in which it is handled by users.

The input by such training users may also be tracked and correlated over time. In particular, as users become more adept at, and comfortable with, using motion-based inputs on their mobile devices, their inputs may change. For instance, users may initially perform flip-unflip motions by turning their devices almost 180 degrees in each direction, but over time may become more casual with the input and turn their devices only 120 degrees. Such changes in user behavior may thus be tracked and accounted for. For example, the model that is constructed from training data to be applied to a subsequent user may be correlated to training data for others users when they had a level of experience with a device that corresponds to the level of experience for the subsequent user. Such a dynamic model implementation may allow a device to better track the natural handling of a device by various users.

Using this technique, the manner in which typical users of mobile device progress in their use of a device can be accounted for in a model of user motion behavior that is used for motion matching with subsequent users. In this manner, devices for subsequent users may better match the natural progression of usage by those users, and their devices may operate more accurately and intuitively in response to their motion-based inputs.

In a particular study that was undertaken, a motion recognizer application was implemented in JAVA using the Android SDK on NEXUS ONE's with a QUALCOMM 8250 1 GHz processor, a three-axis accelerometer, and an orientation sensor. The NEXUS ONE's accelerometer measures the acceleration applied to the device minus the force of the earth's gravity along three axes. The orientation sensor measures the degrees of azimuth, pitch, and roll of the device. Azimuth is defined as the angle between the magnetic north direction and the y-axis, around the z-axis. Pitch is the measurement of rotation around the x-axis, while roll is the measurement of rotation around the y-axis. While the NEXUS ONE also includes proximity, ambient light, and magnetic sensors, only the accelerometer and orientations sensors were used in this study because they are common in all Android-based devices.

Referring again to the process of FIG. 3A, at box 308, a model of motion data for gestures is built. The model may take various forms, including as a composite of measurements processed in the manner described below. The building of the data model, in particular, may match the manner in which particular inputs from later users are processed before being compared to the "baseline" data in the model. The model may be represented in various forms that may permit ready matching of the model to subsequent users' motion data in order to determine what inputs the subsequent users are trying to provide (assuming that the subsequent users provide motion-based inputs that are similar to those provided by the users in the training group).

At box 310, the processed model data is provided to other user devices—devices used by the subsequent users discussed above. In particular, in the case of very simple motion-based models, the information learned from the testing or training group may be used to establish threshold data for triggering the recognition of a delimiter input for changing the mode of a device. Such providing of the model may occur by the model data being built into operating system data that is loaded on new computing devices, so that such devices may be ready to accept motion-based inputs as soon as they are purchased and enabled. The data may also be downloaded to a preexisting device, such as when a user chooses to have motion-based input functionality like that described here added to their device after they purchase it. Alternatively, some or all of the model data may accessed at run-time from a central server system, and updated model data may be downloaded to a device automatically so as to keep the data up-to-date.

At box 312, motion-based gesture control is executed on the other user devices employing the model or models that were developed using the training group. The particular control operations may involve receiving data from sensors on a device, quantizing the data in a particular manner, and using the quantized data for gesture recognition. Particular example processes for such operations are shown in FIGS. 4A and 4B.

Figure 4A:
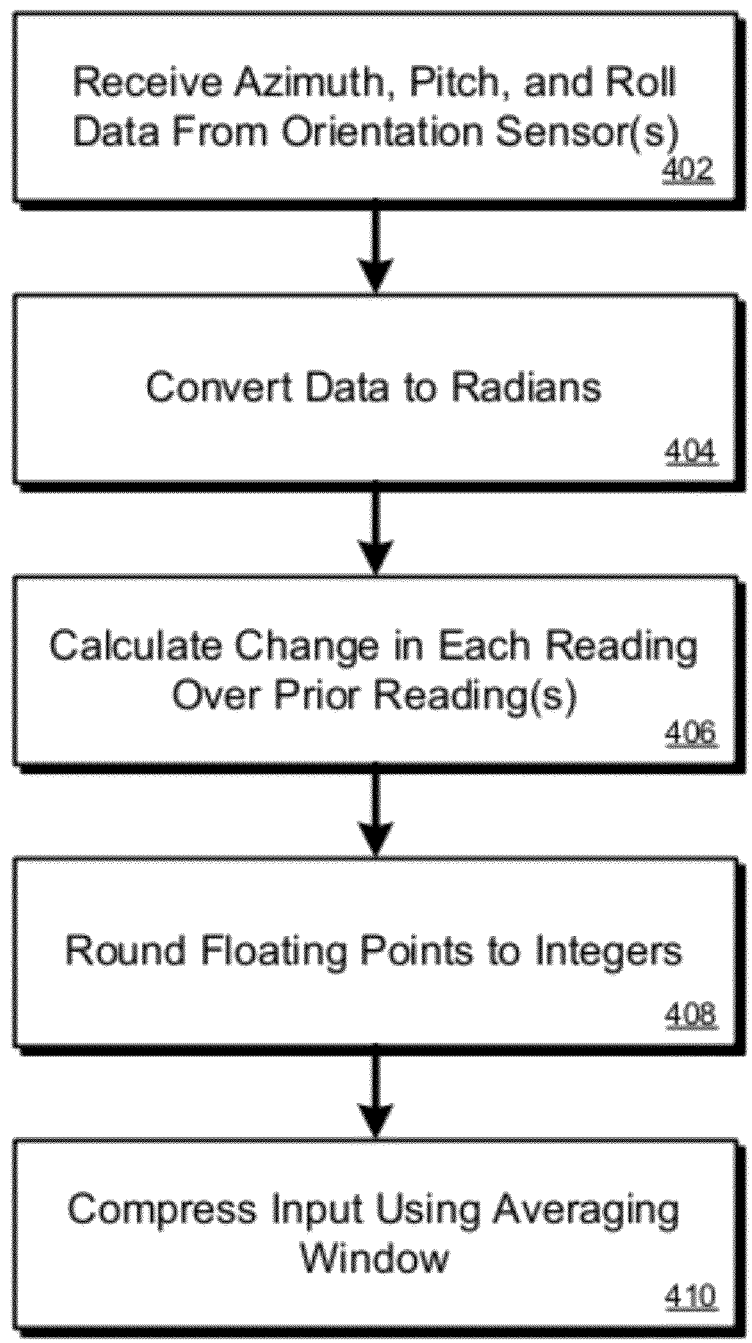
FIGS. 4A and 4B are flow charts of methods for processing motion-based input to a mobile electronic device.
Figure 4B:
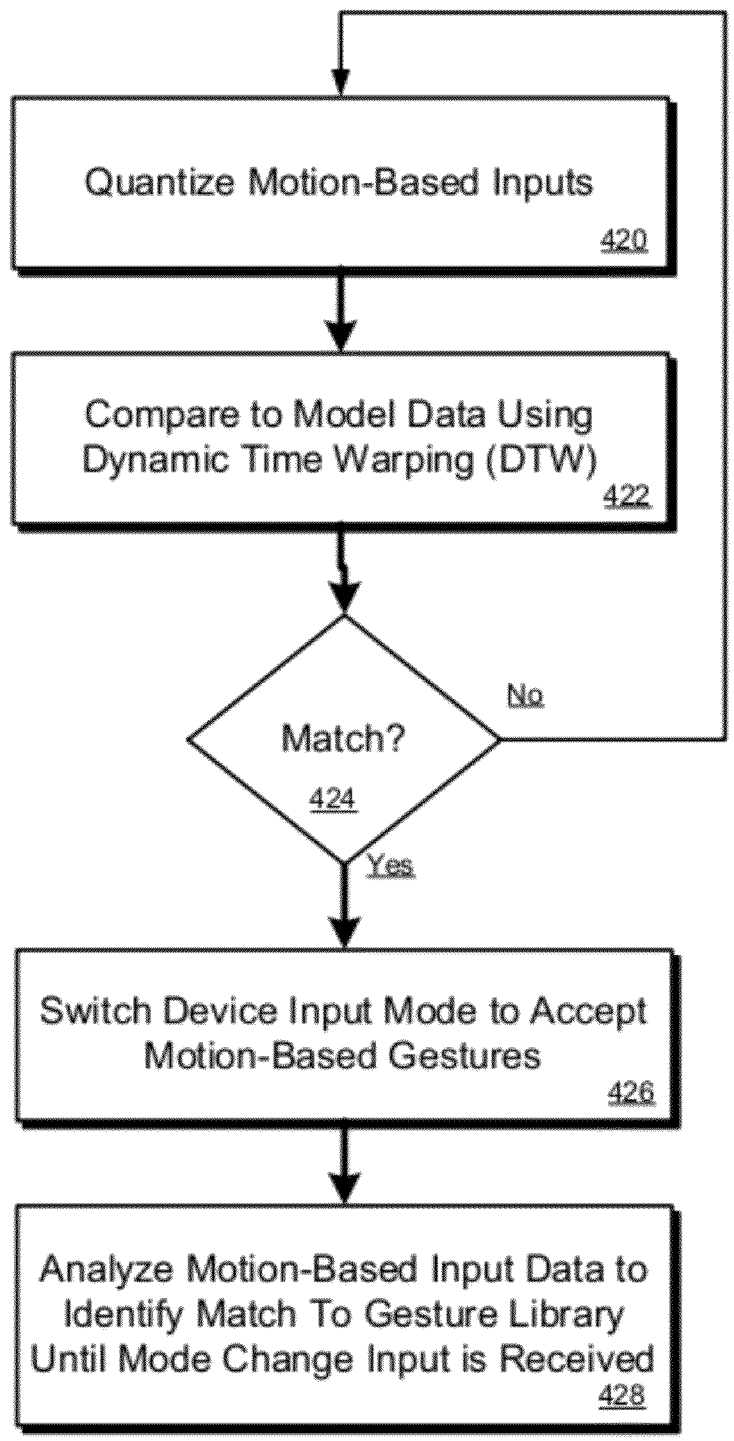

FIGS. 4A and 4B are flow charts of methods for processing motion-based input to a mobile electronic device. FIG. 4A shows an example method for quantizing sensor values, which may be used in capturing motion data from users in a training group in building a motion-based model, or from subsequent users for comparison to the model, in order to determine the input intent of those subsequent users. The need for quantization was primarily a result of acceleration being measured in relation to the Earth's gravity and not actual motion of the device. The inclusion of the Earth's gravity results in different accelerometer readings depending on how the user is holding the phone. The goal in this example was to ensure that the recognizer is able to detect a double-flip (flip/unflip) gesture regardless of the angle at which the user is holding their computing device.

The process begins at box 402, where an electronic device receives azimuth, pitch, and roll data from orientation sensors in the device. Such data may come in a variety of forms, and may be initially processed by a relevant motion-based chip set, and then further processed by a microprocessor in the device.

At box 404, those readings are converted from degrees to radians, which helps to compress the scale of possible orientation values, such that acceleration readings are not made irrelevant (leading to many false positives). At box 406, the values are normalized by calculating the differences in the readings over prior readings, because all acceleration values are dependent on the current orientation of the device and azimuth is determined by magnetic North.

At box 408, floating point values are rounded to integers, which lowers the level of computation that is required while maintaining adequate accuracy. The level of rounding may be adjusted based on the processing power available on the device, and the level of accuracy that is required from the computations.

At box 410, the input is compressed by using an averaging window across the data. The window is a 200 ms window that is moved in 100 ms steps. The compression shortens the input gesture for comparison purposes, and also filters noise generated from the sensor readings. By this process then, quantized data is available to describe the motion of a particular gesture by a user.

FIG. 4B is a flow chart of a process for recognizing gesture inputs from motion or orientation data on a mobile computing device. This process follows the quantization process for users who are employing a model generated from a training group like that described above, and is used to distinguish random unintentional motion from intentional motion, such as the flip flop, or double flip, motion discussed above with respect to FIGS. 1A and 1B.

As shown at box 420, motion-based inputs are received by a computing device and are quantized. The inputs may be received when the device is in a motion-based input mode, or may be received to determine whether a user of a device has entered motions that would place the device into such a mode.

The data for such inputs may be grouped in various manners so as to delineate the intended beginning of a motion-based input, and the intended end of such an input. Such action may occur by starting the capture of data when a device that was previously at rest is placed in motion. A running window may be applied to the data that is generated, and testing of the data may also take placed periodically over the current window, with comparisons made until a match with a model of a known motion-based input is determined. Various other manners may also be used for sampling the data and determining how to use the data to identify matching motion between a model from among a plurality of stored models, and particular motion that has been sensed from a user's manipulation of their computing device.

In this example, at box 422, the captured data for a user's device is compared to model data from a training group, using Dynamic Time Warping (DTW), which is a classical algorithm that is based on dynamic programming, and is used to match two time series with temporal dynamics, given the function for calculating the distance between two time samples. DTW has become increasingly popular in human-computer interaction (HCI) due to its simplicity to implement and limited amount of required training samples compared to other methods.

Thus, for example, a user may pick up their device from a surface with the device's display facing upward. The user may then grasp the device, flip it substantially all the way over along its longitudinal axis and then flip it back—almost as if they are dumping it out through the display and then putting it back in place. Such motion can be sensed by various sensors that are installed in a typical smart phone, and can be reported to an analysis application to determine whether the input motion was intended by the user to represent something, and what it was intended to represent.

The implementation applied to the double-flip gesture discussed here uses a weighted Euclidean distance function for calculating the distance between the quantized time series of acceleration and orientation to the DTW templates. Because the display facing away from the user can be viewed as an important characteristic of the gesture, the process here doubles the weight to the Euclidean distance of pitch and roll compared to that of azimuth and acceleration along the three axes. Giving higher weight to pitch and roll minimizes the probability that normal motion will be recognized as a double flip gesture. If the calculated distance is less than a given threshold, the recognizer reports a match for the double flip gesture (box 424). Otherwise, the process returns to collecting and quantizing motion-based inputs (which can include motion-based orientation inputs).

One drawback to the DTW algorithm is the need to typically compare all templates or models with the incoming gesture. Due to the limited computation resources available in mobile phones compared to desktop computers, it can be important to maximize accuracy while minimizing the number of templates or models required. To determine the appropriate number of templates, the implementation here was benchmarked by varying the number of templates available to the DTW algorithm. The benchmark consisted of performing recognition 200 times on a recorded input stream for different levels of available templates.

The time to match increased quickly at first as templates were added, but then decreased. After approximately 30 templates, the time needed to match the incoming gesture was around 50 ms/per recognition task. While this is still relatively quick, it is at this point when the sensors are collecting data faster than the recognizer was able to process the incoming data. Therefore, in this example, the number of available templates was limited to 20 templates to provide an adequate temporal buffer in case of variation in computation times that may arise. Of course, as processing power increases, more templates or models may be addressed, and more complex comparisons can be made.

Referring again to FIG. 4B, at box 426, the device's input mode is switched when there is a sufficient match. In this example, based on the determination that a double flip input was provided, the mode is switched to a mode in which other motion-based gestures are accepted on the device. Thus, initially, the device may have been open only to the particular double flip motion-based gesture shown in this document. However, after such a gesture is provided by a user, the device may make itself open to various other motion-based gestures, including gestures that are more subtle than the double flip gesture, and thus would not be appropriate motion-based gestures to leave active on the device at all times. In other words, a gesture for invoking motion-based input may be selected to require more deliberate motion by a user, than are motions associated with other motion-based inputs that may be entered once the mode is switched, under the assumption that the user, after invoking the motion-based input mode, will be more careful about accidentally jostling their device.

At box 428, the user continues to provide motion-based input, and the process identifies (e.g., using the quantizing and matching just discussed) whether that input matches particular defined gestures that were not available until after the double flip gesture was provided to change the device mode. Eventually, the user may change the mode back to its initial state, such as by performing another double flip gesture. The particular mode in which the device is currently set may be indicated, for example, by an icon on a display of the device. The device may also provide an audible indication when it is changing modes, and may also provide tactile feedback in such a situation (e.g., vibrating slightly in the user's hand when it has recognized a gesture).

In this process, a match is indicated when the distance calculated by DTW between a user's input motions and a template from a saved model is below a threshold distance. Setting the threshold too low (requiring a more exact match) will result in the gesture being difficult to perform, resulting in a high rate of false negatives. In contrast, setting the threshold too high will result in a high rate of false positives. An appropriate measure of distance can be determine readily by testing with various users who enter purposeful motion-based inputs, and by determining how readily those purposeful inputs (i.e., inputs for which the user intended the device to recognize the gesture that the device did recognize) are distinguished by a system from non-purposeful inputs.

Two experiments were conducted in order to find an optimal threshold. A first experiment looked at false positives. To collect data representing the motion that a phone sustains during everyday use, custom software was written in JAVA using the Android SDK to log the data stream received from a device's accelerometer and orientation sensors. The software was also responsible for periodically uploading the recorded data to a secure server whenever the display was off. The ability to remotely collect the data allowed the recruitment of a large number of participants without needing to be physically present. Recruitment of participants was performed by sending an email to an internal email list of employees at a high-tech company asking for volunteers. The email directed the employees to an internal webpage that provided information on the software and a link to download the application. Participants were required to use a NEXUS ONE as their primary mobile device and were asked to run the software for at least 24 hours. Ninety-nine participants installed and ran the software long enough such that at least one log was uploaded to the server. In total, 2169.2 hours of sensor data was collected.

To analyze the dataset, software was written in JAVA to replay the recorded input stream. As the data stream was read, gesture recognition was performed and detected, and double flip gestures were recorded. To determine the effects of threshold on the false positive rate, the program iterated through the complete dataset, incrementing the threshold distance by one for each iteration.

For results of the first study, the false positive rate followed an s-curve shape for false positive rate as the threshold distance was increase, with the false positive rate maxing at about 10%, which is a relatively low rate.

In the second experiment, directed to false positives, the effort was aimed at too low of a threshold that will result in a large number of false negatives that result in user frustration. Ultimately, the experiment looked to find the balance between false positive and false negative conditions.

At the beginning of the study, the researcher described the procedure and demonstrated the double flip gesture. The researcher then handed the participant a phone running the same software used in the first experiment and asked the participant to perform the double flip gesture 20 times, pausing between each gesture. Upon completion, the participants were asked to rate how easy the gesture was to perform using a 5-point Likert. The trial took approximately 5 minutes to complete. Twenty volunteers where recruited using the same email list as the first experiment, resulting in a total of 400 gestures being recorded and analyzed. Data was analyzed using the same software and procedure as in the first experiment.

For results, true positive rates by threshold level rose initially as threshold distance increased, but then quickly hit 100% at a threshold around 41. Table 1 shows the true and false positive rates for the six lowest thresholds from both experiments.

TABLE 1

| Threshold | False Positive | True Positive |
| --- | --- | --- |
| 35 | 0.00% | 73.00% |
| 36 | 0.00% | 82.00% |
| 37 | 0.00% | 87.00% |
| 38 | 0.00% | 89.00% |
| 39 | 0.00% | 96.00% |
| 40 | 0.00% | 98.5% |
| 41 | 0.01% | 100% |

A threshold of 41 in this example was thus optimal, providing a 100% true positive rate while only a 0.01% false positive rate. Users in the study rated the gesture very high with an average rating of 4.6 scale (1 being difficult and 5 being easy). Only one participant rated the gesture lower than "somewhat easy," indicating that they felt using the gesture frequently in succession for a long period of time would result in fatigue.

Study Determining Appropriate Features for a Mode-Changing Gesture

A study of double flipping motion-based input was performed at a technology company. The goal of the study was designed to gauge user responses and comfort with various motion-based input motions that could be used for changing a mobile computing device into a mode in which it was receptive to additional motion-based inputs. 2,100 hours of motion data was captured from the phones of ninety-nine volunteers, and it was found that a recognizer was extremely resistant to false positives (less than 0.01%).

As the first step of the study, twenty volunteers, ten males and ten females, were interviewed. The participants all worked for a high-tech company but did not all hold technical positions. All participants indicated that they used a smartphone as their primary mobile device and ranged between the ages of 21-44 (mean=28, $\sigma$=5.4). The volunteers received a $30 gift certificate to an online bookseller for their participation.

Study Description and Procedure

The study consisted of a semi-structured interview designed to explore users' pre-existing mental views regarding how motion-gesture based interaction should occur. Interviews were videotaped and lasted approximately one hour. At the beginning of the interview, participants were provided with an HTC NEXUS ONE smartphone running custom software developed in JAVA using the Android SDK. The software was responsible for logging all data received from the phone's accelerometer and orientation sensors.

The interviewer then instructed the participant to imagine that the device was a "magical device" with the ability to perfectly infer the user's intended action. Next, the interviewer explained that the study was researching possible uses of motion to interact with a phone, for example, when wearing gloves and unable to interact with the touch screen. The participant was then asked to come up of list of tasks that they believed would benefit from the use of physical motion gestures. For each task the user created, the volunteer was asked to brainstorm possible gestures to represent the task using the think aloud protocol. During this time, the researcher would also ask questions as needed for clarification. Once the participant decided on a final gesture design, he or she was asked to perform the gesture using the provided phone. Finally, the participant was asked to self-rate the gesture he or she designed for how well it matched its intended purpose.

Results

For each interview, a transcript of the recorded video was created to extract individual quotes. The quotes were then clustered to identify common themes using a bottom-up, inductive analysis approach. The following paragraphs describe the emerging themes from those comments that are relevant to the design of the delimiting gesture described here.

First: The desire for moded interaction as a method to reduce false positive and false negative conditions. Even though participants were told to assume the phone had perfect recognition rates, some participants still wanted to explicitly activate and deactivate when the phone was listening for a gesture. Participants expressed their concern about false positive conditions on actions that they considered to be detrimental (i.e. hanging up the phone prematurely) and false negative conditions when confirmation that particular action had been completed was desirable.

To allow a user control over motion gesture mode, a majority of participants suggested the use of a physical button as a method to activate physical motion gesture mode. However, there was no consensus on where the button should be located. In addition, some participants mentioned that holding a button and performing a gesture often made the gesture harder to perform. Another suggestion was the use of a virtual button displayed on the touchscreen. Participants who suggested this method were asked a follow up question on how the mode would be activated when the user was unable to use the screen, such as when wearing gloves. In this situation, participants either mentioned a physical button or wanted to turn off gestures all together.

Second: The screen should be visible at all times. When brainstorming possible gestures, participants were very mindful with being able to see the screen during and after a gesture. Participants who designed gestures where the screen was not visible justified their design decisions by indicated the gesture represented not needing to interact with the phone. Participants favored quick simple gestures that minimized the amount of physical space needed to perform the gesture. Participants who performed larger movements mentioned concern about either hitting themselves or their neighbor.

The Double Flip Delimiter

The requirement for a gesture delimiter is the result of our participants requesting the ability to specify when the system should enable motion gestures. We also recognize that while participants were told to imagine a perfect recognition device, no such device exists. Therefore, the use of a delimiter seems like a reasonable method to reduce false positives and still be able to achieve a high recognition rate.

During our study, participants suggested the use of a physical or a virtual button press as an option to activate motion-based interaction. However, our goal is to allow motion gestures to be used in absence of a touch screen. While a hardware button is feasible, participants commented that holding a button and performing the gesture was often cumbersome. In addition, our goal is to create a delimiter that is not dependent on hardware but instead relies on the sensors commonly available in today's smart phones. Therefore, we decided that the delimiter should be a motion gesture that meets the following requirements:

The gesture should be resistant to false positives. The main goal of having a delimiter is to limit false positives. Therefore, any delimiter must also be resistant to false positives and be a gesture that is unlikely to occur during normal use of the phone.

The screen should be visible after completing the gesture. This allows the user to interact with the phone after the delimiter has been completed.

The gesture should be quick and compact. The physical space required to perform the gesture should be limited in order to allow the gesture to be performed in crowded spaces.

The delimiter should be unique so that it does not collide with a gesture that makes more sense in another context. In other words, the gesture should be distinct from any gestures that a user/developer would likely want to incorporate into an application.

As shown in FIG. 1B, the double flip delimiter is performed by quickly rotating the wrist such that the phone's display is facing away from the user, then back to the original position with the display facing the user. Since during normal use, users commonly interact with the front of the device, due to the location of the display, it is unlikely the gesture will be triggered accidentally—i.e., there is little on the back side of a phone that would interest a user, so they would be unlikely to flip it substantially all the way over unless they wanted to perform a mode change. The need to flip the phone back so the display is facing the user also allows helps fulfills the second design requirement, in that after the gesture has been preformed the user is able to interact with the information presented on the display. Because the gesture can be performed with the simple rotation of the wrist and essentially no movement in the arm, the gesture is also very compact and requires no more physical space then holding the phone such that the screen is visible to the user. In addition, the gesture is easy to perform and can be done quickly.

Finally, while some participants did suggest rotating the phone such that the screen was pointed away from the individual, no participants suggested the double flip gesture. Therefore, the double flip gesture is unlikely to collide with gestures designed by developers.

Figure 5:
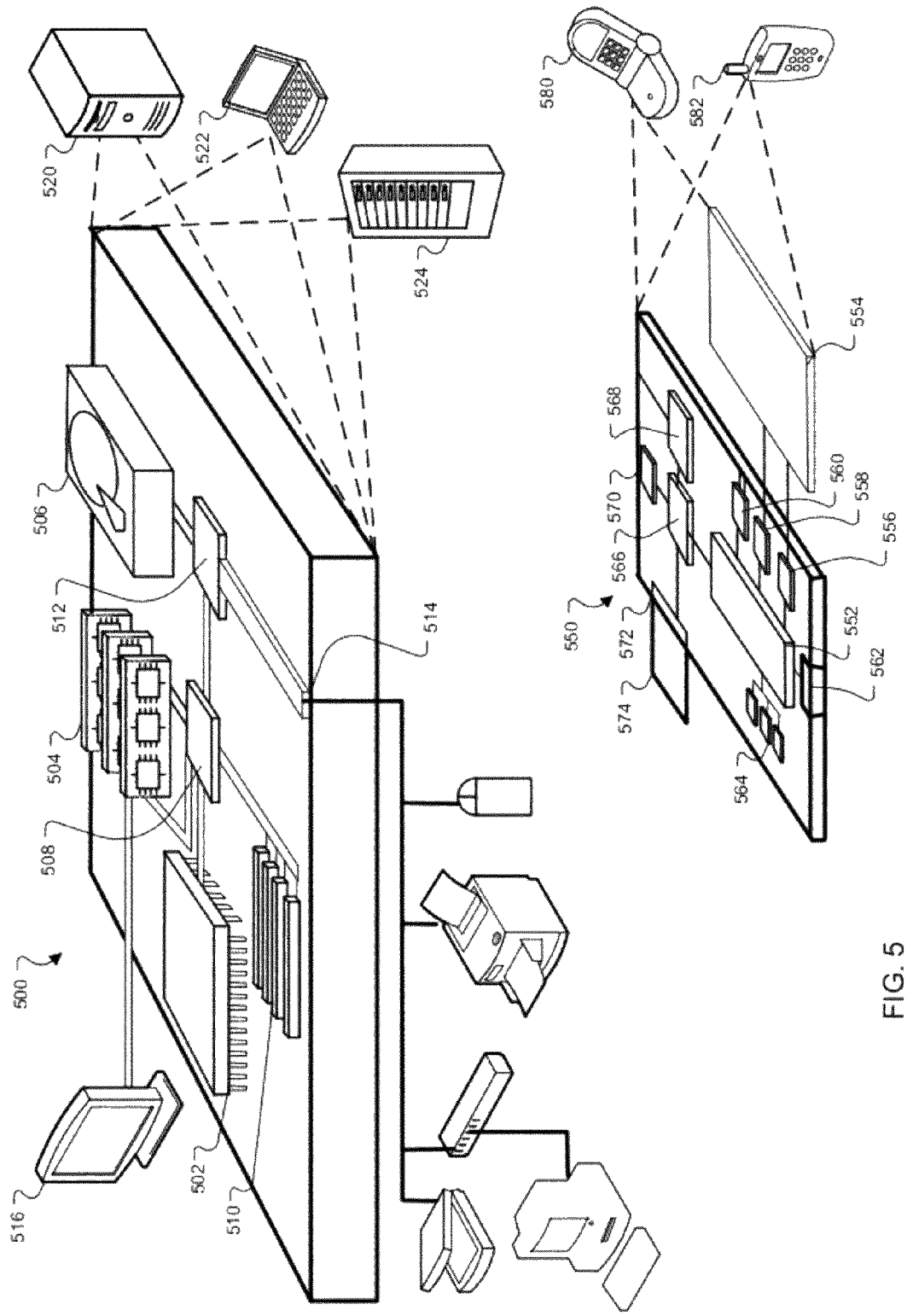
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for identifying motion-based inputs to an electronic device, the method comprising:

placing the electronic device into an operating mode in which one or more functions are disabled;

determining that the electronic device has been rotated in a first direction of rotation past a first threshold orientation;

after determining that the electronic device has been rotated in the first direction of rotation past the first threshold, maintaining the electronic device in the operating mode in which one or more functions are disabled;

determining that the electronic device has been rotated in a second direction of rotation that is substantially the opposite of the first direction of rotation, past a second threshold; and after determining that (i) the electronic device has been rotated in the first direction of rotation past the first threshold, and (ii) the electronic device has been rotated in the second direction of rotation that is substantially the opposite of the first direction of rotation, past the second threshold, placing the electronic device into an operating mode in which the one or more functions are enabled.

2. The method of claim 1, wherein determining that (i) the electronic device has been rotated in the first direction of rotation past the first threshold, and (ii) the electronic device has been rotated in the second direction of rotation that is substantially the opposite of the first direction of rotation, past the second threshold comprises comparing motion data for the device to an electronic model that represents motion by one or more other users performing a mode-switching motion.

3. The method of claim 1, further comprising receiving motion-based gestures from a user of the electronic device and converting the received gestures to commands for one or more applications on the electronic device.

4. The method of claim 3, wherein an input method editor on the electronic device converts the received gestures to commands, selects an active application on the device from among multiple applications, and provides data for the commands to the selected active application.

5. The method of claim 1, wherein the electronic device is in a position so that a graphical display of the electronic device faces a user of the electronic device both before the device is rotated in the first direction and after the device is rotated in the second direction.

6. The method of claim 1, wherein analyzing motion of the device based on (i) determining that the electronic device has been rotated in a first direction of rotation past a first threshold orientation, and (ii) determining that the electronic device has been rotated in a second direction of rotation that is substantially the opposite of the first direction of rotation, past a second threshold the two determinations comprises analyzing data for motion-based input received in a window of time that precedes the rotations in the first direction and the second direction.

7. The method of claim 6, wherein analyzing motion of the device based on (i) determining that the electronic device has been rotated in a first direction of rotation past a first threshold orientation, and (ii) determining that the electronic device has been rotated in a second direction of rotation that is substantially the opposite of the first direction of rotation, past a second threshold comprises interpreting received motion data without switching to a motion-based input mode.

8. A system, comprising:

one or more computers and one or more storage devices storing instructions that are operable, when executed by the one or more computers, to cause the one or more computers to perform operations comprising:

placing the electronic device into an operating mode in which one or more functions are disabled;

determining that the electronic device has been rotated in a first direction of rotation past a first threshold orientation;

after determining that the electronic device has been rotated in the first direction of rotation past the first threshold, maintaining the electronic device in the operating mode in which one of more functions are disabled;

determining that the electronic device has been rotated in a second direction of rotation that is substantially the opposite of the first direction of rotation, past a second threshold; and after determining that (i) the electronic device has been rotated in the first direction of rotation past the first threshold, and (ii) the electronic device has been rotated in the second direction of rotation that is substantially the opposite of the first direction of rotation, past the second threshold, placing the electronic device into an operating mode in which the one or more functions are enabled.

9. The system of claim 8, wherein determining that (i) the electronic device has been rotated in the first direction of rotation past the first threshold, and (ii) the electronic device has been rotated in the second direction of rotation that is substantially the opposite of the first direction of rotation, past the second threshold comprises comparing motion data for the device to an electronic model that represents motion by one or more other users performing a mode-switching motion.

10. The system of claim 8, further comprising operations of receiving motion-based gestures from a user of the electronic device and converting the received gestures to commands for one or more applications on the electronic device.

11. The system of claim 10, wherein an input method editor on the electronic device converts the received gestures to commands, selects an active application on the device from among multiple applications, and provides data for the commands to the selected active application.

12. The system of claim 8, wherein the electronic device is in a position so that a graphical display of the electronic device faces a user of the electronic device both before the device is rotated in the first direction and after the device is rotated in the second direction.

13. The system of claim 8, wherein analyzing motion of the device based on (i) the determining that the electronic device has been rotated in a first direction of rotation past a first threshold orientation, and (ii) determining that the electronic device has been rotated in a second direction of rotation that is substantially the opposite of the first direction of rotation, past a second threshold comprises analyzing data for motion-based input received in a window of time that precedes the rotations in the first direction and the second direction.

14. The system of claim 13, wherein analyzing motion of the device based on (i) the determining that the electronic device has been rotated in a first direction of rotation past a first threshold orientation, and (ii) determining that the electronic device has been rotated in a second direction of rotation that is substantially the opposite of the first direction of rotation, past a second threshold comprises interpreting received motion data without switching to a motion-based input mode.

15. A non-transitory computer-readable medium storing software comprising instructions executable by one or more computers which, upon such execution, cause the one or more computers to perform operations comprising:

placing the electronic device into an operating mode in which one or more functions are disabled;

determining that the electronic device has been rotated in a first direction of rotation past a first threshold orientation;

after determining that the electronic device has been rotated in the first direction of rotation past the first threshold, maintaining the electronic device in the operating mode in which one or more functions are disabled;

determining that the electronic device has been rotated in a second direction of rotation that is substantially the opposite of the first direction of rotation, past a second threshold; and after determining that (i) the electronic device has been rotated in the first direction of rotation past the first threshold, and (ii) the electronic device has been rotated in the second direction of rotation that is substantially the opposite of the first direction of rotation, past the second threshold, placing the electronic device into an operating mode in which the one or more functions are enabled.

16. The medium of claim 15, wherein determining that (i) the electronic device has been rotated in the first direction of rotation past the first threshold, and (ii) electronic device has been rotated in the second direction of rotation that is substantially the opposite of the first direction of rotation, past the second threshold comprises comparing motion data for the device to an electronic model that represents motion by one or more other users performing a mode-switching motion.

17. The medium of claim 15, further comprising operations of receiving motion-based gestures from a user of the electronic device and converting the received gestures to commands for one or more applications on the electronic device.

18. The medium of claim 17, wherein an input method editor on the electronic device converts the received gestures to commands, selects an active application on the device from among multiple applications, and provides data for the commands to the selected active application.

19. The medium of claim 15, wherein the electronic device is in a position so that a graphical display of the electronic device faces a user of the electronic device both before the device is rotated in the first direction and after the device is rotated in the second direction.

20. The medium of claim 15, wherein analyzing motion of the device based on (i) the determining that the electronic device has been rotated in a first direction of rotation past a first threshold orientation, and (ii) determining that the electronic device has been rotated in a second direction of rotation that is substantially the opposite of the first direction of rotation, past a second threshold comprises analyzing data for motion-based input received in a window of time that precedes the rotations in the first direction and the second direction.

21. The medium of claim 20, wherein analyzing motion of the device based on (i) the determining that the electronic device has been rotated in a first direction of rotation past a first threshold orientation, and (ii) determining that the electronic device has been rotated in a second direction of rotation that is substantially the opposite of the first direction of rotation, past a second threshold comprises interpreting received motion data without switching to a motion-based input mode.

* * * * *

UNITED STATES PATENT AND TRADEMARK OFFICE
CERTIFICATE OF CORRECTION

PATENT NO. : 8,228,292 B1  
APPLICATION NO. : 13/249575  
DATED : July 24, 2012  
INVENTOR(S) : Jaime Guillermo Ruiz Page 1 of 1

It is certified that error appears in the above-identified patent and that said Letters Patent is hereby corrected as shown below:

Column 21, line 51, claim 6, after "threshold" delete "the two determinations";

Column 22, line 48, claim 13, after "(i)", delete "the";

Column 22, line 57, claim 14, after "(i)", delete "the";

Column 24, line 14, claim 20, after "(i)", delete "the"; and

Column 24, line 24, claim 21, after "(i)", delete "the".

Signed and Sealed this
Twenty-third Day of October, 2012

David J. Kappos
*Director of the United States Patent and Trademark Office*